US011122639B2

(12) United States Patent
Axelsson et al.

(10) Patent No.: US 11,122,639 B2
(45) Date of Patent: Sep. 14, 2021

(54) TECHNIQUE FOR PROVIDING MULTIPLE RADIO ACCESS NETWORK CONNECTIVITY TO TERMINAL DEVICE

(71) Applicant: Telefonaktiebolaget LM Ericsson (publ), Stockholm (SE)

(72) Inventors: Håkan Axelsson, Linköping (SE); Rasmus Axén, Linköping (SE); Rui Fan, Beijing (CN); Stefan Johansson, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 16/339,457

(22) PCT Filed: Oct. 17, 2016

(86) PCT No.: PCT/CN2016/102262
§ 371 (c)(1),
(2) Date: Apr. 4, 2019

(87) PCT Pub. No.: WO2018/072059
PCT Pub. Date: Apr. 26, 2018

(65) Prior Publication Data
US 2020/0053809 A1 Feb. 13, 2020

(51) Int. Cl.
*H04W 76/16* (2018.01)
*H04L 9/08* (2006.01)
(Continued)

(52) U.S. Cl.
CPC ........... *H04W 76/16* (2018.02); *H04L 9/0819* (2013.01); *H04W 12/033* (2021.01);
(Continued)

(58) Field of Classification Search
CPC . H04W 76/16; H04W 12/0013; H04W 88/06; H04W 92/20; H04W 76/15; H04L 9/0819; H04L 2209/80
See application file for complete search history.

(56) References Cited

U.S. PATENT DOCUMENTS 10,136,329 B2  11/2018  Mochizuki et al.
2016/0157293 A1  6/2016  Pazhyannur et al.
(Continued)

FOREIGN PATENT DOCUMENTS

CN  105706387 A  6/2016
EP  3065484 A1  9/2016
(Continued)

OTHER PUBLICATIONS

Roessler, A. et al., "LTE—Advanced (3GPP Rel.12) Technology Introduction", White Paper, Jun. 1, 2014, pp. 1-60, 1MA252.2E, Rohde & Schwarz.
(Continued)

*Primary Examiner* — Pao Sinkantarakorn
*Assistant Examiner* — Kabir U Jahangir
(74) *Attorney, Agent, or Firm* — Sage Patent Group

(57) ABSTRACT

A technique for providing multiple connectivity to a terminal device by at least a first Radio Access Network, RAN entity and a second RAN entity is disclosed. The first RAN entity serves as a control plane anchor and the split bearer will be anchored at the second RAN entity. The method comprises triggering, by the first RAN entity, the second RAN entity to set up the split bearer on the user plane. The split bearer comprises at least a first bearer leg from the second RAN entity via the first RAN entity to the terminal device and a second bearer leg from the second RAN entity to the terminal device without going through the first RAN entity.

22 Claims, 10 Drawing Sheets

(51) Int. Cl.
*H04W 12/033* (2021.01)
*H04W 88/06* (2009.01)
*H04W 92/20* (2009.01)

(52) U.S. Cl.
CPC ......... *H04L 2209/80* (2013.01); *H04W 88/06* (2013.01); *H04W 92/20* (2013.01)

(56) References Cited

U.S. PATENT DOCUMENTS

2016/0255675 A1  9/2016  Van Lieshout et al.
2020/0008255 A1* 1/2020  Sharma ............. H04W 12/0401

FOREIGN PATENT DOCUMENTS

| EP | 3242510 A1 | 11/2017 |
|---|---|---|
| WO | 2015037926 A1 | 3/2015 |
| WO | 2016021541 A1 | 2/2016 |
| WO | 2016071076 A1 | 5/2016 |
| WO | 2016125887 A1 | 8/2016 |

OTHER PUBLICATIONS

Docomo Inc., "Discussion on U-plane architecture for dual connectivity", 3GPP TSG-RAN WG2 #81bis, Chicago, USA, Apr. 14, 2013, pp. 1-7, Tdoc R2-131120, (Revision of R2-130324), 3GPP.
Zhang, J. et al., "LTE Small Cell Enhancement by Dual Connectivity", White paper, Outlook Visions and Research Directions for the Wireless World, Wireless World Research Forum, Nov. 1, 2014, pp. 1-22, No. 15, Version 1.1.
Samsung, "On the need of new DR B types in NR", 3GPP TSG-RAN WG2 Meeting #94, Nanjing, China, May 23, 2016, pp. 1-4, R2-163749 (Re-submission of R2-162298), 3GPP.
ZTE, "SCG Split Bearer for NR", 3GPP TSG RAN WG3 Meeting #93, Gothenburg, Sweden, Aug. 22, 2016, pp. 1-4, R3-161629, 3GPP.
ZTE, "TP for SCG Split Bearer", 3GPP TSG RAN WG3 Meeting #93bis, Sophia-Antipolis, France, Oct. 10, 2016, pp. 1-4, R3-162154, 3GPP.
3rd Generation Partnership Project, "3rd Generation Partnership Project; Technical Specification Group Radio Access Network; Study on New Radio Access Technology; Radio Access Architecture and Interfaces (Release 14)", Technical Report, 3GPP TR 38.801 V0.4.0, Aug. 1, 2016, pp. 1-36, 3GPP.
3rd Generation Partnership Project, "3rd Generation Partnership Project; Technical Specification Group Radio Access Network; Study on New Radio Access Technology; Radio Interface Protocol Aspects (Release 14)", Technical Report, 3GPP TR 38.804 V0.3.0, Aug. 1, 2016, pp. 1-22, 3GPP.
Catt, "Consideration on Key Refresh Procedure", 3GPP TSG-RAN WG3 #85bis, Shanghai, China, Oct. 6, 2014, pp. 1-6, R3-142172, 3GPP.
Alcatel-Lucent et al., "Discussion on Intra-MeNB HO and Capturing in Stage 2", 3GPP TSG RAN WG2 Meeting #87bis, Shanghai, China, Oct. 6, 2014, pp. 1-4, R2-144512, 3GPP.
3rd Generation Partnership Project, "3rd Generation Partnership Project; Technical Specification Group Radio Access Network; Study on Small Cell Enhancements for E-UTRA and E-UTRAN; High Layer Aspects (Release 12)", Technical Report, 3GPP TR 36.842 V12.0.0, Dec. 1, 2013, pp. 1-72, 3GPP.

* cited by examiner

TECHNIQUE FOR PROVIDING MULTIPLE RADIO ACCESS NETWORK CONNECTIVITY TO TERMINAL DEVICE

TECHNICAL FIELD

The present disclosure generally relates to the provision of connectivity to a terminal device via two or more Radio Access Network (RAN) entities. The present disclosure can be embodied in one or more of methods, RAN entities, systems, and computer programs.

BACKGROUND

Long Term Evolution (LTE) Release 12 as standardized by the 3$^{rd}$ Generation Partnership Project (3GPP) suggests a dual connectivity architecture that permits terminal devices to aggregate the user plane capacities of two RAN entities. The two RAN entities include a Master eNodeB (MeNB) and a Secondary eNodeB (SeNB).

The MeNB serves as a control plane anchor in the dual connectivity architecture. The control plane anchor terminates towards the core network one mobility management (MM) connection per terminal device and, towards the terminal device, a single Radio Resource Control (RRC) connection. The SeNB is thus relieved from certain control plane operations such as MM and RRC.

There are two options for configuring the user plane in the dual connectivity architecture of LTE Release 12. These options are also referred to as Master Cell Group (MCG)/Secondary Cell Group (SCG) bearers and MCG split bearer. In the first case, which is also denoted as UP 1A architecture, for a particular terminal device a dedicated bearer is set up between at least one of the MeNB and the SeNB on the one hand and the core network on the other. In the second case, which is also denoted as UP 3C architecture, there exists only a single bearer between the MeNB and the core network. In the MeNB, that bearer is split up in a first bearer leg from the MeNB via the SeNB to the terminal device and a second bearer leg from the MeNB directly to the terminal device. Advantages and drawbacks of each option are discussed in "LTE Small Cell Enhancement by Dual Connectivity", Working Group C "Communication Architectures and Technologies", White Paper, Version 1.1, November 2014.

There have been suggestions to introduce a third user plane configuration for the LTE dual connectivity architecture. This third option is called SGC split bearer. According to the SGC split bearer concept, the SeNB splits up a bearer in a first bearer leg from the SeNB via the MeNB to the terminal device and a second bearer leg from the SeNB directly to the terminal device.

The document R2-163749 "On the need of new DRB types in NR" that was presented in the 3GPP TSG-RAN WG2 Meeting #94 in Nanjing, China, 23-27 May 2016 proposes a reconfiguration of an SGC bearer as SGC split bearer in case the existing link becomes unreliable. An advantage of such a reconfiguration is the fact that no path switch in the core network will occur, so that a data interruption can be avoided. The proposal made in R2-163749 aims at a change of the underlying standard that will not just have an impact on the MeNB and SeNB, but also on one or both of the core network side and the terminal side.

SUMMARY

There is a need for a technique that provides improved multiple connectivity to a terminal device via multiple RAN entities.

According to one aspect, a method of providing multiple connectivity to a terminal device by at least a first RAN entity and a second RAN entity is provided, wherein the first RAN entity serves as a control plane anchor. The method comprises triggering, by the first RAN entity, the second RAN entity to set up a split bearer on a user plane, wherein the split bearer comprises at least a first bearer leg from the second RAN entity via the first RAN entity to the terminal device and a second bearer leg from the second RAN entity to the terminal device without going through the first RAN entity.

The second RAN entity may be triggered via signalling occurring over an X2 interface between the first RAN entity and the second RAN entity. The second RAN entity may be triggered via proprietary signalling to set up the split bearer. The triggering of the second RAN entity may be performed responsive to a triggering decision locally performed by the first RAN entity.

The method may further comprise obtaining, by the first RAN entity, a user plane encryption key for the split bearer. The user plane encryption key may be sent to the second RAN entity for application by the second RAN entity to data packets on at least the second bearer leg (and, optionally, also to data packets on the first bearer leg). The user plane encryption key may be obtained by the first RAN entity from the core network or may be generated by the first RAN entity (e.g., by deriving the user plane encryption key from a base key received from the core network). The user plane encryption key may be sent when triggering the second RAN entity to set up the split bearer (e.g., in a corresponding triggering message).

In some variants, the user plane encryption key may be $K_{UPenc}$ according to LTE Release 12 or later. In the same or other variants, the user plane encryption key may be the same key as if the user plane of the split bearer was anchored at the first RAN entity. As such, the terminal device may be kept agnostic of the fact that the user plane of the split bearer is actually anchored at the first RAN entity (i.e., the RAN entity that serves as the control plane anchor).

The method may further comprise triggering setup of one or more of a Radio Link Control (RLC) entity and a Medium Access Control (MAC) entity at the first RAN entity and for the terminal device. Additionally, or in the alternative, the method may further comprise triggering setup of one or more of a Packet Data Convergence Protocol (PDCP) entity, an RLC entity and an MAC entity at the second RAN entity and for the terminal device.

The method may also comprise informing a core network that the split bearer is anchored at the second RAN entity. To this end, signalling occurring over an S1 interface (or a similar interface as defined by a 5$^{th}$ Generation or higher communication standard) between the first RAN entity and the core network may be used. Informing the core network that the split bearer is anchored at the second RAN entity may specifically comprise sending a network address of the second RAN entity to the core network. The network address is, for example, an Internet Protocol (IP) address of the second RAN entity. The network address may specifically be sent to a Service Gateway (S-GW) within the core network.

The method may further comprise triggering, by the first RAN entity, setup of the split bearer at the terminal device. The corresponding triggering may be performed via Radio Resource Control (RRC) signaling. The terminal device may be triggered to set up the split bearer responsive to receipt of a bearer setup acknowledgement from the second RAN entity at the first RAN entity.

The method may further comprise receiving, by the first RAN entity, data packets from the second RAN entity on the first bearer leg and forwarding the data packets on the first bearer leg to the terminal device. The data packets may be received from the second RAN entity via an X2 interface between the first RAN entity and the second RAN entity.

The method may further comprise triggering setup of a flow control receiver entity for a flow control link between an RLC entity of the first RAN entity and a PDCP entity of the second RAN entity. The flow control receiver entity may be configured for communication with a flow control transmitter entity on the second RAN entity.

The first RAN entity may serve as a control plane anchor for mobility management in regard of the terminal device. Additionally, or in the alternative, the first RAN entity may serve as a control plane anchor for RRC in regard of the terminal device.

The method may also comprise evaluating whether to set up the split bearer at the first RAN entity or at the second RAN entity. It may then be decided to set up the split bearer at the second RAN entity (e.g., based on radio link measurements or load measurements at the first RAN entity or based on Radio Access Technology, RAT, support as required by the terminal device). In such a case, triggering the second RAN entity to set up the split bearer may be performed responsive to a decision to set up the split bearer at the second RAN entity.

The method may further comprise deciding about a relocation of at least a portion of the split bearer from the second RAN entity to a third RAN entity. In such a case the third RAN entity may be triggered to set up the split bearer. Moreover, cryptographic material, in particular the user plane encryption key previously used by the second RAN entity, may be sent to the third RAN entity. Moreover, the core network may be informed that the split bearer has been relocated to the third RAN entity.

According to a further aspect, a method of providing multiple connectivity to a terminal device via a first RAN entity and a second RAN entity is provided, wherein the first RAN entity serves as a control plane anchor. The method comprises setting up, at the second RAN entity and in response to being triggered by the first RAN entity, a split bearer on a user plane, wherein the split bearer comprises a first bearer leg from the second RAN entity to the terminal device without going through the first RAN entity and a second bearer leg from the second RAN entity via the first RAN entity to the terminal device.

The method according to the second aspect may further comprise receiving a user plane encryption key for the split bearer from the first RAN entity. The user plane encryption key as received from the first RAN entity may be applied to data packets on at least the first bearer leg (and, optionally, also to data packets on the second bearer leg).

The method according to the second aspect may also comprise receiving data packets for the terminal device from a core network and distributing the data packets received from the core network among the first bearer leg and the second bearer leg. The data packets may be encrypted using the user plane encryption key prior to their distribution.

The method according to the second aspect may further comprise setting up one or more of a PDCP entity, an RLC entity and an MAC entity at the second RAN entity and for the terminal device. The corresponding entity or entities may be set up as part of the split bearer setup procedure at the second RAN entity.

The method according to the second aspect may also comprising setting up of a flow control transmitter entity for a flow control link between a PDCP entity of the second RAN entity and an RLC entity of the first RAN entity. The flow control transmitter entity may be set up as part of the split bearer set up procedure at the second RAN entity.

The method according to the second aspect may also comprise sending a bearer setup acknowledgement to the first RAN entity after at least one of the following has been set up: the PDCP, RLC and MAC entities and the flow control transmitter entity.

In all the aspects presented herein, the bearer leg that goes through the first RAN entity may be compliant with LTE (and earlier 3GPP standards) only. On the other hand, the bearer leg that does not go through the first RAN entity may be compliant with a RAT beyond LTE, such as a $5^{th}$ Generation (5G) RAT. At least from a control plane perspective, the first RAN entity may assume the role of an MeNB, and a second RAN entity may assume the role of an SeNB. In some variants, the first RAN entity and the second RAN entity may separate hardware entities on a single network node.

Also provided is a computer program product comprising program code portions to perform the steps of any of the methods presented herein when executed on one or more processors. The computer program product may be stored on computer-readable recording medium such as a semiconductor memory, DVD, and so on. The computer program product may also be provided for download via a communication connection.

According to a further aspect, an RAN entity for a system capable of providing multiple connectivity to a terminal device via at least a first RAN entity and a second RAN entity is provided, wherein the first RAN entity serves as a control plane anchor. The RAN entity according to this aspect is the first RAN entity and is configured to trigger the second RAN entity to set up a split bearer on a user plane, wherein the split bearer comprises at least a first bearer leg from the second RAN entity via the first RAN entity to the terminal device and a second bearer leg from the second RAN entity to the terminal device without going through the first RAN entity.

According to another aspect, an RAN entity for a system capable of providing multiple connectivity to a terminal device via at least a first RAN entity and a second RAN entity is provided, wherein the first RAN entity serves as a control plane anchor. The RAN entity according to this aspect is the second RAN entity and is configured to set up, at the same RAN entity and in response to being triggered by the first RAN entity, a split bearer on a user plane, wherein the split bearer comprises at least a first bearer leg from the second RAN entity to the terminal device without going through the first RAN entity and a second bearer leg from the second RAN entity via the first RAN entity to the terminal device.

The RAN entities according to the preceding two aspects may be configured to perform any of the method steps and method aspects presented herein.

Also provided is a system comprising the first RAN entity and the second RAN entity as disclosed herein.

BRIEF DESCRIPTION OF THE DRAWINGS

Further aspects, advantages and details of the present disclosure will be described below with reference to exemplary embodiments, wherein.

DETAILED DESCRIPTION

In the following description, for purposes of explanation and not limitation, specific details are set forth, such as specific RATs and specific signaling procedures, in order to provide a thorough understanding of the technique discussed herein. It will be apparent to one skilled in the art that the technique may be practiced in other embodiments that depart from these specific details.

Moreover, those skilled in the art will appreciate that the services, functions, steps and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced Reduced Instruction Set Computer (RISC) Machine (ARM).

It will also be appreciated that, while the following embodiments are primarily described in the context of methods and devices, the present disclosure may also be embodied in a computer program product as well as in a system comprising one or more processors and one or more memories coupled to the one or more processors, wherein the one or more memories are encoded with one or more programs that perform the services, functions, steps and implement the modules disclosed herein when executed on the one or more processors.

Embodiments of the present disclosure include triggering setup of the split bearer at a second RAN entity based on a direct communication between a first RAN entity and the second RAN entity to avoid in certain variants an involvement of the terminal device and the core network. As such, the terminal device and the core network may remain agnostic of the corresponding bearer setup communication.

Figure 1:
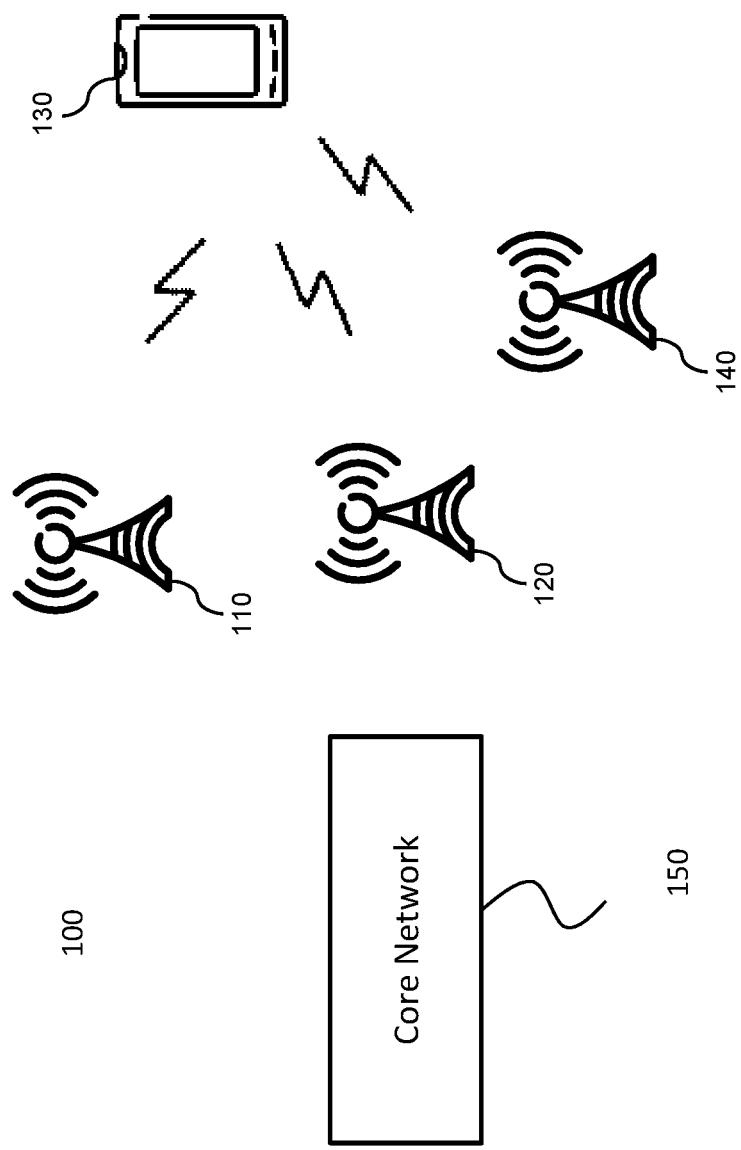
FIG. 1 illustrates a system embodiment with two RAN entities providing dual connectivity to a terminal device.

FIG. 1 illustrates an exemplary multiple connectivity system 100 in which the present disclosure can be implemented. As illustrated in FIG. 1, the system 100 comprises at least two RAN entities 110, 120, at least one terminal device 130, an optional further RAN entity 140 as well as a core network 150. The two RAN entities 110, 120 are configured to provide dual connectivity to the terminal device 130. The third RAN entity 140 may optional provide additional connectivity.

The individual RAN entities 110, 120, 140 are each configured as a base station (e.g., as an evolved NodeB) and are interconnected via a so-called X2 interface on both the user plane and the control plane. Additionally, each of the RAN entities 110, 120, 140 is connected to the core network 150 via a so-called S1 interface on both the user plane and the control plane. Moreover, each of the RAN entities 110, 120, 140 is configured to be connected to the terminal device 130 via a so-called Uu interface on both the user plane and the control plane. The individual interfaces are not shown in FIG. 1.

Figure 2A:
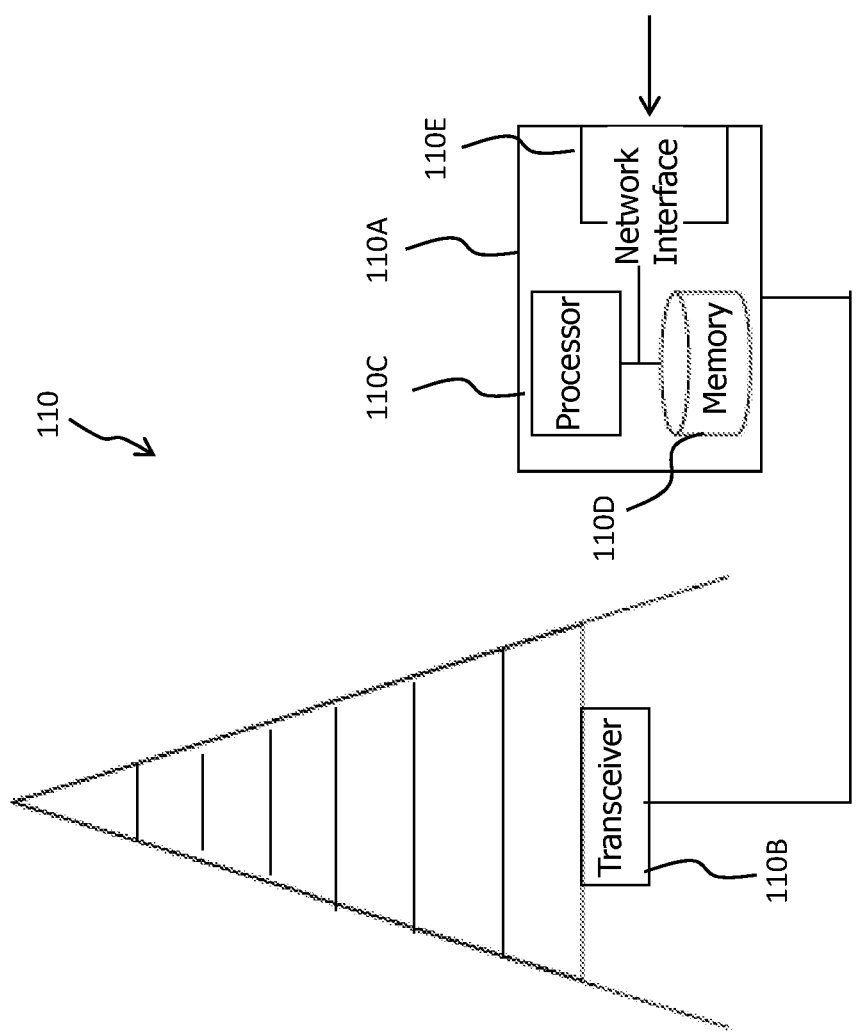
FIGS. 2A to 2C illustrate apparatus and module embodiments of the two RAN entities illustrated in FIG. 1.

FIG. 2A illustrates an exemplary realisation of the RAN entity 110. It will be appreciated that the remaining RAN entities 120, 140 may have a similar configuration.

As illustrated in FIG. 2A, the RAN entity 110 comprises a control unit 110A as well as a transceiver 110B coupled to the control unit 110A. The transceiver 110B is configured to communicate with the terminal device 130 using one or more RATs. The control unit 110A comprises a processor 110C, a memory 110D coupled to the processor 110C as well as a network interface 110E coupled to both the processor 110C and the memory 110D. The control unit 110A may be coupled to the core network 150 and one or both of the remaining RAN entities 120, 140 via the network interface 110E. The processor 110C is configured to perform the operations discussed herein under control of program code stored in the memory 110D. The memory 110D may also store data, protocol stack information and other information, as required for implementing the present disclosure.

Figure 2B:
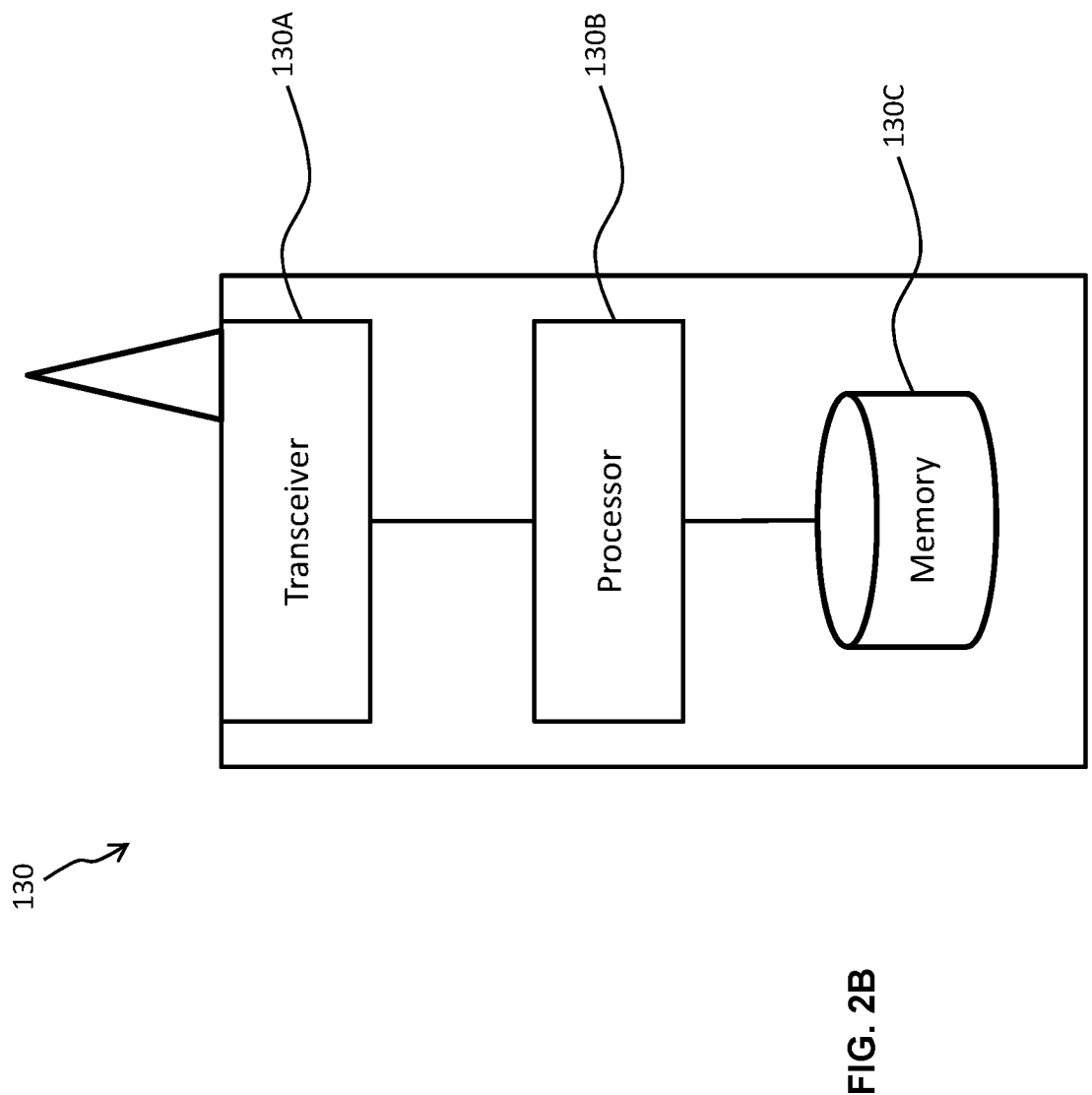

FIG. 2B illustrates a block diagram of the terminal device 130. As shown in FIG. 2B, the terminal device 130 comprises a transceiver 130A that is coupled to a processor 130B. The terminal device 130 further comprises a memory 130C coupled to the processor 130B. The memory 130D stores program code that controls the operations of the processor 130B in accordance with the present disclosure. The transceiver 130A is configured to wirelessly communicate with the corresponding transceiver 110B of the RAN entity 110 (as well as the corresponding transceivers of the one or more of the remaining RAN entities 120, 140).

Figure 2C:
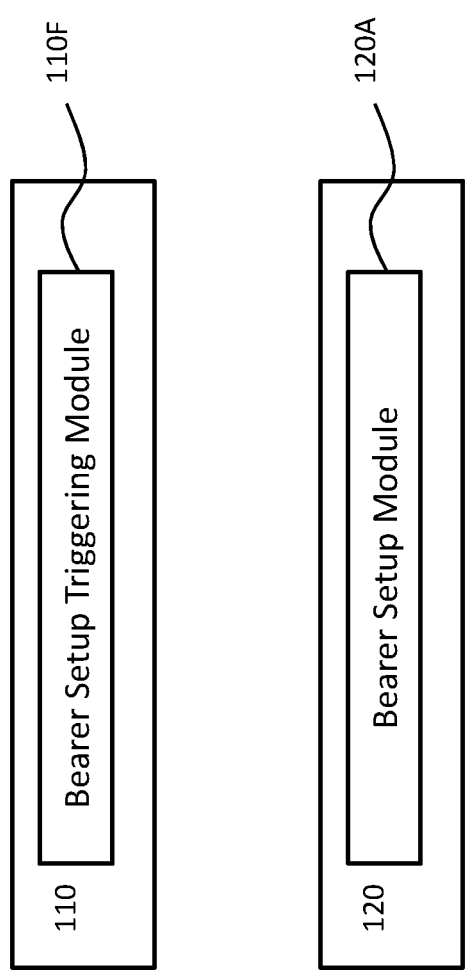

FIG. 2C shows a further implementation of the RAN entities 110, 120. As illustrated in FIG. 2C, the RAN entity 110 comprises a bearer setup triggering module 110F, and the RAN entity 120 comprising a corresponding bearer setup module 120A. The modules 110F, 120A may be realized as hardware or software entities. In some variants, the modules 110F, 120A may be realized as program code that is stored in the corresponding memory (reference numeral 110D in FIG. 2A) of the RAN entities 110, 120.

Figure 3:
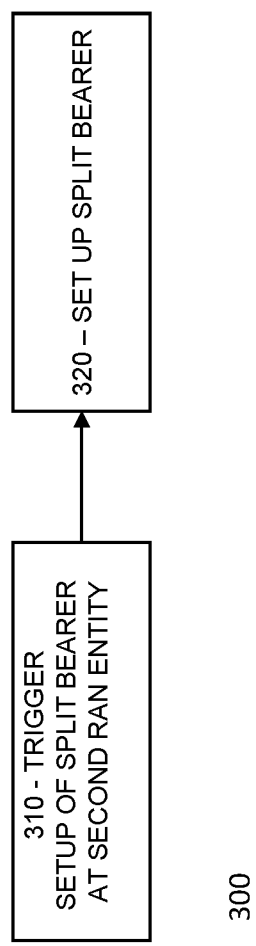
FIG. 3 illustrates a method embodiment according to the present disclosure.

FIG. 3 illustrates a flow diagram 300 of a first method embodiment that may be jointly performed by a first RAN entity and a second RAN entity such as the RAN entities 110, 120 shown in FIGS. 1 and 2A to 2C (the RAN entities will in the following thus exemplarily be denoted by the same reference numerals as used in FIGS. 1 and 2). The method embodiment is performed in connection with providing multiple connectivity via the first and second RAN entities 110, 120 to a terminal device such as the terminal device 130 shown in FIG. 1 (the terminal device will in the following exemplarily be denoted as User Equipment, UE, and by the same reference numeral as used in FIG. 1). From a control plane perspective, the first RAN entity 110 may assume the role of an MeNB and the second RAN entity 120 may assume the role of an SeNB.

For the flow diagram 300 it will be assumed that the first RAN entity 110 serves as a control plane anchor and maintains this function while providing multiple connectivity to the UE 130 in combination with the second RAN entity 120. As the control plane anchor, the first RAN entity 110 is involved in mobility management (e.g., handovers) for the UE 130. In regard of mobility management, the first RAN entity will be in communication with a corresponding core network node (e.g., a so-called Mobility Management Entity, MME). Moreover, and still in its function as a control plane anchor, the first RAN entity 110 will be involved in RRC in regard of the UE 130. It will be appreciated that the control plane anchor function of the first RAN entity 110 may involve additional or alternative management and control functions. Moreover, the first RAN entity 110 will continue acting as the control plane anchor for the UE 130 regardless of any (possibly changing) further RAN entities, such as the third RAN entity 140, being involved in providing or being intended to provide multiple connectivity to the UE 130.

In a first step 310, the first RAN entity 110 triggers the second RAN entity 120 to setup a split bearer on a user plane. The triggering procedure may be performed by the control unit 110 as illustrated in FIG. 2A or the triggering module 110F as illustrated in FIG. 2C.

The split bearer that is to be set up is intended to comprise at least a first bearer leg from the second RAN entity 120 via the first RAN entity 110 to the UE 130 and a second bearer leg from the second RAN entity 120 directly (i.e., without going to the first RAN entity 110) to the UE 130. The split bearer may comprise one or more further bearer legs from the second RAN entity 120 to third, fourth, etc. RAN entities.

In a second step 320, the second RAN entity 120 sets up the split bearer on the user plane in response to being triggered by the first RAN entity 110. The bearer setup procedure may be performed by the control unit 110 as illustrated in FIG. 2A or the setup module 120A as illustrated in FIG. 2C. As explained above, the split bearer, after having been set up, comprises at least a first bearer leg from the second RAN entity 120 via the first RAN entity 110 to the UE 130 and a second bearer leg from the second RAN entity 120 directly (i.e., without going to the first RAN entity 110) to the UE 130.

Triggering bearer setup is performed via signaling between the first RAN entity 110 and the second RAN entity 120 (e.g., via the X2 interface). This bearer setup signaling may be proprietary signaling as defined by a manufacturer of the first and second RAN entities 110, 120. In such a case, no standardization body such as 3GPP will have defined the bearer setup signaling. In many implementations such standardization is not necessary as, for example, the UE 130 and also the core network 150 may remain agnostic of the actual signaling that takes place between the first RAN entity and the second RAN entity 120 in connection with triggering setup of the split bearer.

In some variants, triggering bearer setup comprises triggering setup of one or more of (e.g., all of) a PDCP entity, an RLC entity and an MAC entity at the second RAN entity 120 and for the UE 130. The PDCP entity at the second RAN entity may be a functional part of first and second bearer legs, while the RLC and MAC entities may be functional parts of the second bearer leg only. The first RAN entity may locally trigger setup of one or more of (e.g., all of) an RLC entity and an MAC entity for the UE 130 as functional part of the first bearer leg.

Prior to or after triggering bearer setup, the first RAN entity 110 obtains a user plane encryption key for the split bearer. The user plane encryption key, such as $K_{UPenc}$ (e.g., according to LTE Release 12 or later), may be sent by the first RAN entity 110 to the second RAN entity 120 for application by the second RAN entity 120 to data packets on the second bearer leg (and, optionally, the first bearer leg and any further bearer leg). The user plane encryption key may additionally be applied by the first RAN entity 110 to data packets on the first bearer leg from the first RAN entity to the UE 130 (e.g., in case the data packets are received on the first bearer leg by the first RAN entity 110 in an unencrypted manner from the second RAN entity 120).

The user plane encryption key can be sent by the first RAN entity 110 to the second RAN entity 120 in connection the bearer setup signaling or, alternatively, in a separate procedure. In the first case, the user plane encryption key may be sent in a message that triggers setup of the split bearer on the side of the second RAN entity 120.

Figure 4:
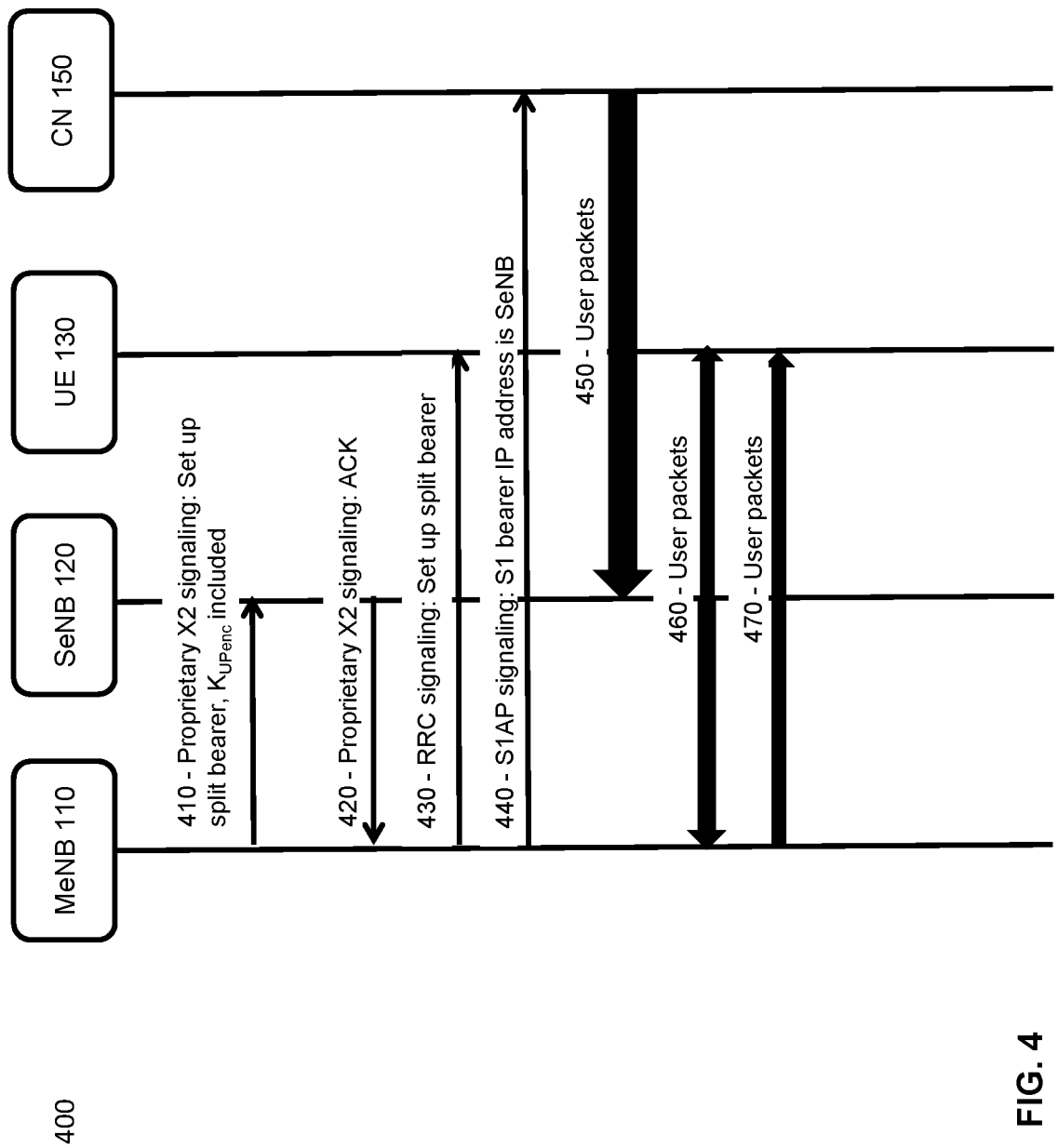
FIG. 4 illustrates a signaling and data transmission diagram according to an embodiment of the present disclosure.

FIG. 4 illustrates the procedures of triggering setup of a split bearer and sending data packets via the split bearer in a signaling and data transmission diagram 400. Bearer setup signaling as illustrated in FIG. 4 involves the first RAN entity 110 (in its role as MeNB), the second RAN entity 120 (in its role as SeNB), the UE 130 as well as the core network 150 (e.g., a Service-Gateway, S-GW, in the core network 150). The procedures illustrated in FIG. 4 may be performed in connection with the method embodiment discussed above with reference to FIG. 3 or in other scenarios.

In signaling step 410, the first RAN entity 110 sends a triggering message to the second RAN entity 120 to trigger the second RAN entity 120 to set up a split bearer that, after having been set up, comprises at least a first bearer leg from the second RAN entity 120 via the first RAN entity 110 to the UE 130 and a second bearer leg from the second RAN entity 120 directly to the UE 130. The triggering message includes the user plane encryption key such as $K_{UPenc}$ (e.g., according to LTE Release 12 or later) for direct application by the second RAN entity 120 to data packets intended for the UE 130. The triggering message can have a proprietary, non-standardized format.

The user plane encryption key $K_{UPenc}$ may be generated by the first RAN entity 110 based on locally available cryptographic material such as $K_{eNB}$ (e.g., according to LTE Release 12 or later). $K_{eNB}$, in turn, may have been received by the first RAN entity 110 from the UE 130 or the core network 150. The UE 130 or core network 150 may have generated $K_{eNB}$ based on one or more secret keys installed on the UE 130.

Receipt of the triggering message is acknowledged by the second RAN entity 120 to the first RAN entity 110 in a second signaling step 420. To this end, an ACK message is sent by the second RAN entity 120 to the first RAN entity 110. The ACK message may have a proprietary, non-standardized format.

Responsive to receipt of the ACK message, the first RAN entity 110 triggers setup of the split bearer at the UE 130. Corresponding RRC signaling (e.g., in accordance with LTE Release 12 or later) in regard of the split bearer that is to be setup is performed in signaling step 430. As such, the UE 130 will obtain the impression that the split bearer is anchored at the first RAN entity 110. The UE 130 may thus remain agnostic of the preceding signaling steps 410, 420, so that compatibility in regard of legacy UEs can be obtained if desired.

Further responsive to receipt of the ACK message in signaling step 420, the first RAN entity 110 informs the core network 150 that the split bearer will be anchored at the second RAN entity 120. To this end, the first RAN entity 110 sends a message over the S1 interface in signaling step 440 to the core network 150. The message includes a network address of the second RAN entity 120, typically its IP address. In some instances the massage may be compliant with existing standards to maintain compatibility in regard of legacy core networks.

As a result of the signaling steps 410 to 440 illustrated in FIG. 4, the split bearer is set up with a first bearer leg from the second RAN entity 120 via the first RAN entity 110 to the UE 130 and a second bearer leg from the second RAN entity 120 to the UE 130 without going to the first RAN entity 110. The core network 150 has been informed that the split bearer is anchored at the second RAN entity 120 and will thus send the data packets intended for the UE 130 to the second RAN entity 120 (see data transmission step 450 in FIG. 4). The second RAN entity 120 encrypts the received data packets by directly applying thereon the user plane encryption key received from the first RAN entity 110 in signaling step 410. A first portion of the encrypted data packets is then sent by the second RAN entity 120 on the first bearer leg over the X2 interface to the first RAN entity 110 (data transmission step 460) and further from the first RAN entity 110 via the air interface to the UE 130 (data transmission step 470). In parallel, the remaining portion of the encrypted data packets is sent by the second RAN entity 120 in data transmission step 460 on the second bearer leg directly via the air interface to the UE 130.

Figure 5:
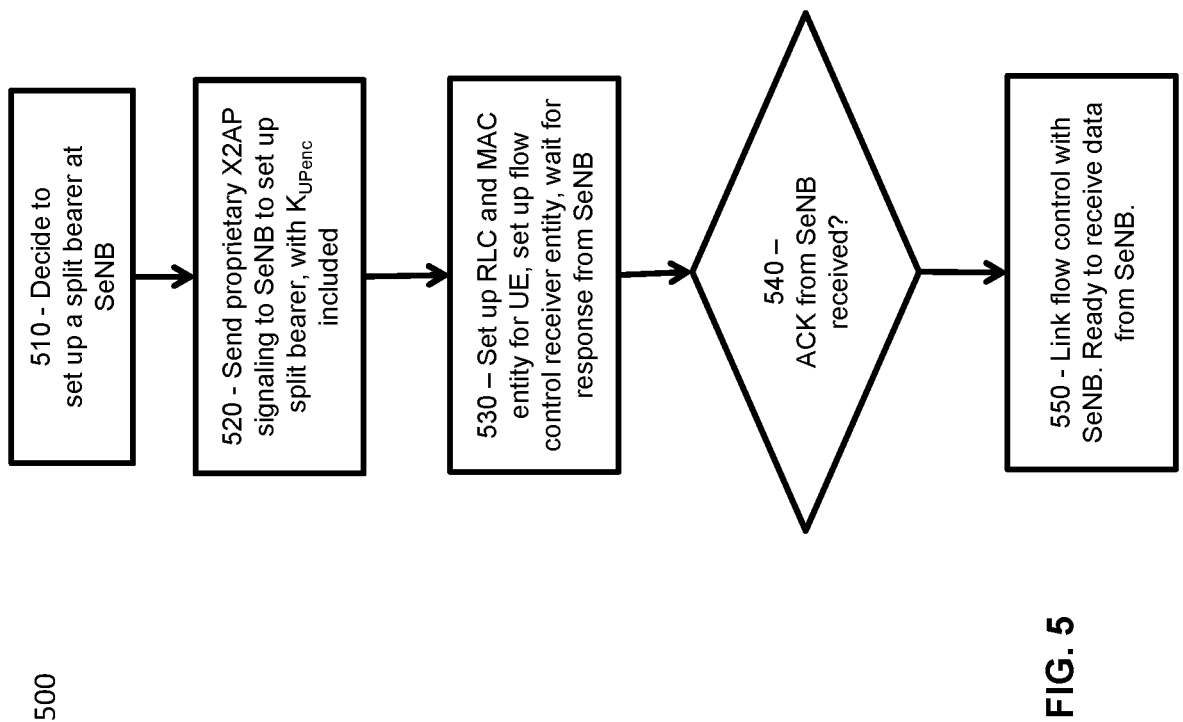
FIG. 5 shows an embodiment of a method as performed by a first RAN entity.

FIG. 5 illustrates the procedure of triggering setup of a split bearer in a flow diagram 500 from the perspective of the first RAN entity 110. As explained above, the split bearer will comprise a first bearer leg from the second RAN entity 120 via the first RAN entity 110 to the UE 130 and a second bearer leg from the second RAN entity 120 directly (i.e., without going to the first RAN entity 110) to the UE 130. The procedure illustrated in FIG. 5 may be performed in connection with the embodiments discussed above with reference to FIGS. 3 and 4, or in other scenarios.

In step 510, the first RAN entity 110, or MeNB, decides to setup a split bearer that is anchored at the second RAN entity 120, or SeNB. The decision may be based on the RATs supported by one or more of the first RAN entity 110, the second RAN entity 120, and the UE 130. Additionally, or in the alternative, the decision may be based on one or more of a load status and a radio link statutes of the first RAN entity 110.

Responsive to the decision in step 510, the first RAN entity 110 triggers setup of split bearer at the second RAN entity 120 in step 520 (e.g., as discussed above with reference to signaling step 410 in FIG. 4). Moreover, and also responsive to the decision in step 520, the first RAN entity 110 sets up RLC and MAC entities for the UE 130 and a flow control receiver entity in step 530.

The first RAN entity 110 then waits for an acknowledgement from the second RAN entity 120 (e.g., as discussed above with reference to signaling step 420 in FIG. 4).

Once the acknowledgement is received in step 540, the first RAN entity 110, in step 550, links flow control with the second RAN entity 120 (e.g., links the flow control receiver entity that has been set up in step 530 with a flow control transmitter entity on the side of the second RAN entity 120). At this point, the first RAN entity 110 is ready to receive data packets on the second bearer leg from the second RAN entity 120 and to forward the received data packets on the second bearer leg to the UE 130. In case no acknowledgement is received in step 540, the split bearer setup procedure may be repeated or aborted.

Figure 6:
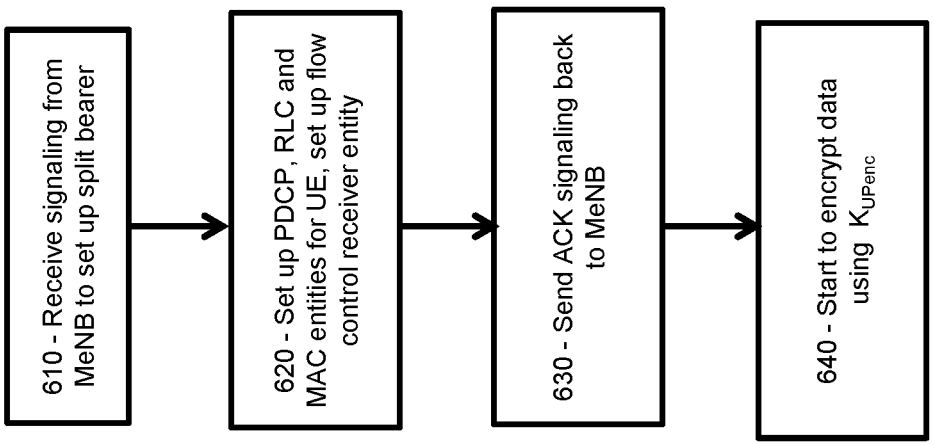
FIG. 6 shows an embodiment of a method as performed by a second RAN entity.

FIG. 6 illustrates the procedure of setting up a split bearer in a flow diagram 600 from the perspective of the second RAN entity 120. The split bearer will again comprise a first bearer leg from the second RAN entity 120 via the first RAN entity 110 to the UE 130 and a second bearer leg from the second RAN entity 120 directly (i.e., without going to the first RAN entity 110) to the UE 130. The procedure illustrated in FIG. 6 may be performed in connection with the embodiments discussed above with reference to FIGS. 3, 4 and 5, or in other scenarios.

In step 610, the second RAN entity 120 receives from the first RAN entity 110 signaling triggering the second RAN entity 120 to setup the split bear (e.g., as discussed above with reference to signaling step 410 in FIG. 4). As a part of the split bearer setup procedure, and responsive to the signaling received in step 520, the second RAN entity 120 sets up PDCP, RLC and MAC entities for the UE 130 and a flow control transmitter entity in step 620. After step 620, the second RAN entity 120 sends an ACK message to the first RAN entity (e.g., as discussed above with reference to signaling step 420 in FIG. 4).

At some point, the second RAN entity 120 starts to receive from the core network 150 data packets for being transmitted on the split bearer to the UE 130. The second RAN entity 120 encrypts the received data packets using the user plane encryption key $K_{UPenc}$ as received from the first RAN entity (typically in step 610) and forwards the encrypted data packets on the two legs of the split bearer towards the UE 130 (see data transmission steps 450, 460 and 470 in FIG. 4).

Figure 7:
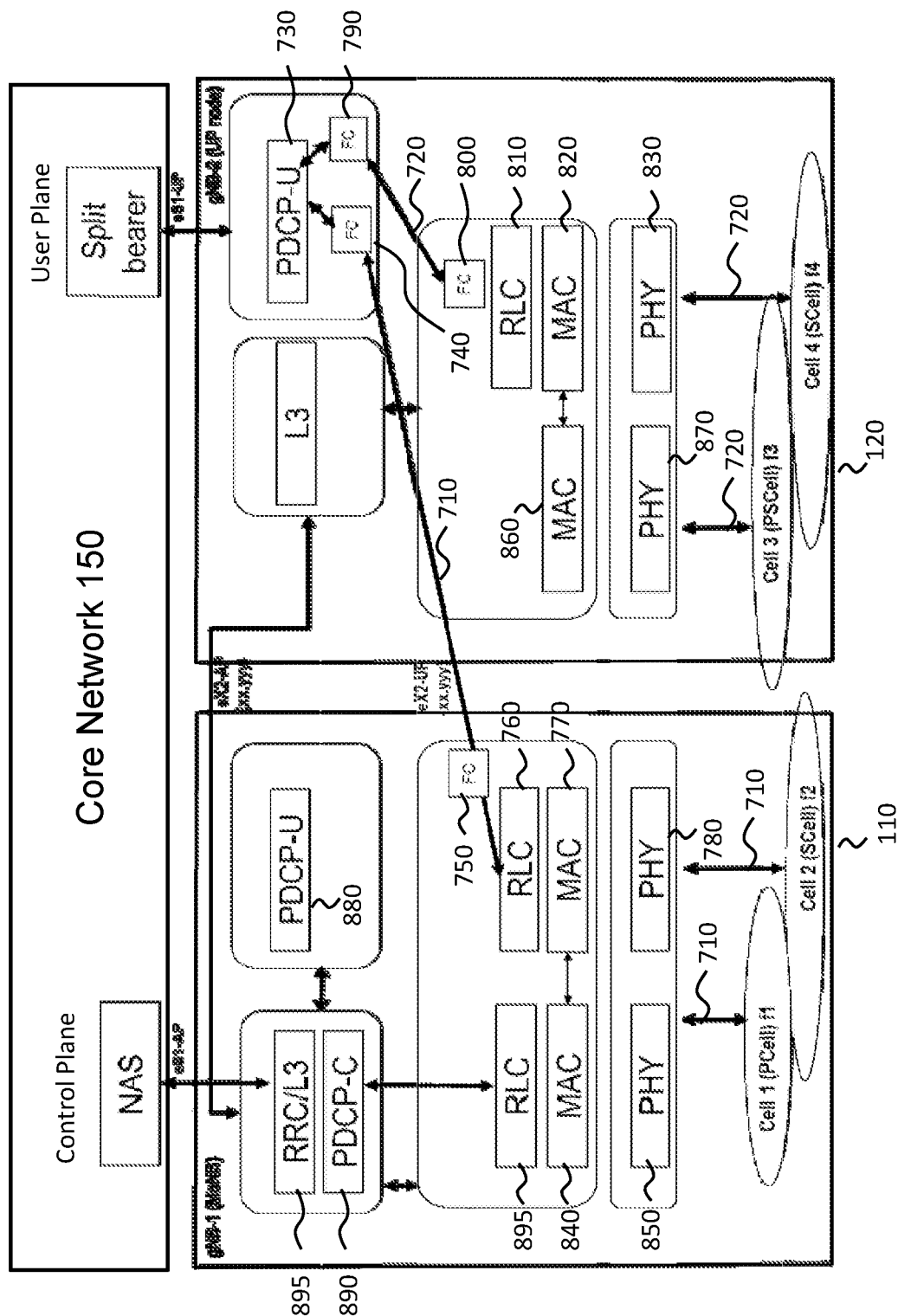
FIG. 7 shows an embodiment of the protocol architecture of first and second RAN entities providing dual connectivity to a terminal device.

FIG. 7 schematically illustrates protocol stacks of the first and second RAN entities 110, 120 in connection with data transmission on the split bearer to the UE 130 (the latter is not shown in FIG. 7). The protocol stacks as illustrated in FIG. 7 may have been set up in accordance with the procedures discussed above with reference to FIGS. 3 to 6, or otherwise.

In FIG. 7 it is assumed that the data transmission to the UE 130 occurs via two cells per RAN entity 110, 120, i.e., cells f1 to f4. Cells f1 and f3 constitute primary cells from the perspective of the first RAN entity 110 and the second RAN entity 120, respectively. Similarly, cells f2 and f4 constitute secondary cells from the perspective of the first RAN entity 110 and the second RAN entity 120, respectively. It will be appreciated that the present disclosure may also be implemented in connection with only one cell per first and second RAN entity 110, 120.

The first RAN entity 110, as the control plane anchor, handles Non Access Stratum (NAS) signaling for the UE 130 and in regard of the core network 150 (not shown in FIG. 7). This signaling includes PDCP-related control plane signaling, RRC signaling as well as other signaling on, for example, Layer 3 (L3). Associated signaling also occurs over the X2 interface between the first and second RAN entities 110, 120. As an example, the first RAN entity 110 informs the second RAN entity via such signaling about mobility management decisions (e.g., handover decisions) in regard of the UE 130.

Each of the first RAN entity 110 and the second RAN entity 120 comprises dedicated PDCP, RLC, MAC and PHY entities for the UE 130 (and, optionally, the respective cells). Importantly, the split bearer (that has been set up, for example, as explained with reference to FIGS. 3 to 6) is anchored at the second RAN entity 120 and comprises a first bearer leg 710 as well as a second bearer leg 720. The first bearer leg 710 functionally includes (in this order) a PDCP entity 730 and a first flow control transmitter entity 740 on the second RAN entity 120 as well a first flow control receiver entity 750, an RLC entity 760, a MAC entity 770 and a PHY entity 780 on the first RAN entity 110. The second bearer leg 720 functionally includes (in this order) the PDCP entity 730, a second flow control transmitter entity 790, a second flow control receiver entity 800, an RLC entity 810, a MAC entity 820 and a PHY entity 830 on the second RAN entity 120. Additional MAC and PHY entities 840, 850, 860, 870 may optionally be provided in case multiple cells are provide per RAN entity 110, 120, wherein there exists a data link between the respective MAC entities 760, 840 and 810, 860 of the RAN entities 110, 120.

Moreover, the first RAN entity 110 comprises a dedicated user plane PDCP entity 880, and a dedicated RLC entity 885 with a link to a control plane PDCP entity 890. Moreover, an RRC entity 895 is provided. The PDCP and RRC entities 890, 895 are configured to communicate with associated L3 entities of the second RAN entity 120 for signaling when the first RAN entity 110 assumes its role as control plane anchor. The corresponding communication on the control plane is performed via the X2 interface between the two RAN entities 110, 120.

In one embodiment, a change of the user plane anchor node of the split bearer, i.e., the second RAN entity 120, is performed (e.g., due to radio quality issues or RAN entity overload in regard of the second RAN entity 120). The change may be performed without notifying the UE 130.

In such a split bearer relocation scenario, all user plane nodes that may serve as user plane anchor nodes share and apply the same user plane encryption key as originally provided by the first RAN entity 110. During a relocation of the split bearer, only the user plane is (at least partially) relocated, whereas the first RAN entity 110 remains the control plane anchor (e.g., maintains the RRC connection to the UE 130).

Figure 8:
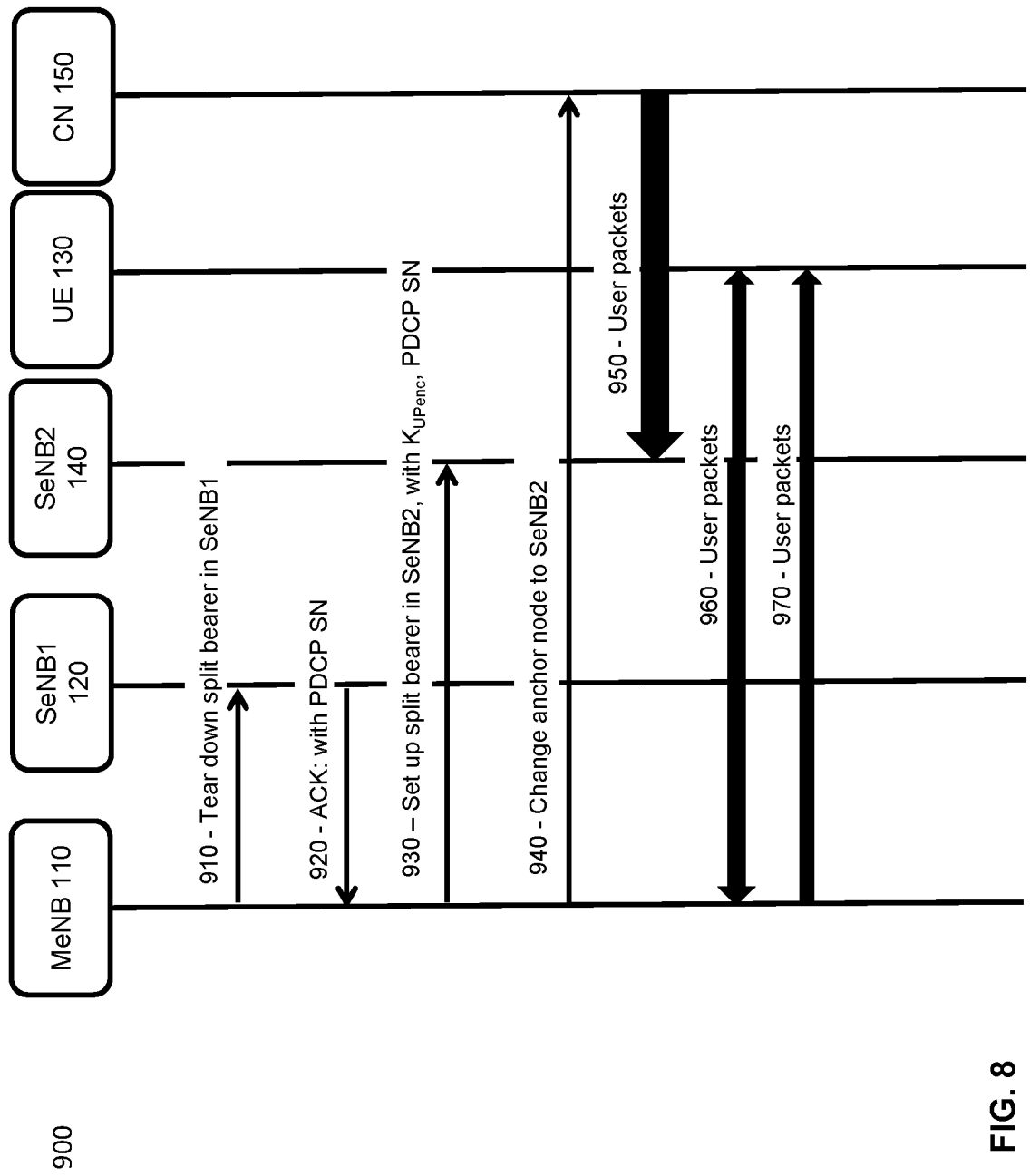
FIG. 8 shows a signaling diagram of a bearer relocation embodiment.

FIG. 8 illustrates in a diagram 900 a signaling embodiment of changing the user plane anchor node. The embodiment may be performed in the context of any of the embodiments described above. As a prerequisite of the change of the user plane anchor node, a connection between the UE 130 and the second RAN entity 120 (denoted as SeNB1 in FIG. 8) has already been established. It will further be assumed that the new user plane anchor node is a third RAN entity 140 (denoted as SeNB2 in FIG. 8) and that the relocation decision is performed by the first RAN entity 110 (denoted as MeNB in FIG. 8).

In a first signaling step 910, the first RAN entity 110 asks the second RAN entity 120 to tear down the split bearer in the second RAN entity 120. Responsive to receipt of an acknowledgement from the second RAN entity 120 in signaling step 920 with a notification of the current PDCP Serial Number (SN), the first RAN entity 110 asks the third RAN entity 140 to setup the split bearer again (see signaling step 930). The corresponding message, or a later message, includes the user plane encryption key that has been applied for the split bearer that has been torn down at the second RAN entity 110 (e.g., $K_{UPenc}$ as discussed above). The third RAN entity 140 may thus continue using this key for user data encryption. Moreover, the corresponding message, or a later message, includes the PDCP SN as received from the second RAN entity 120. As such the PDCP entity of the third RAN entity 140 can assume the state of the PDCP entity of the second RAN entity 120 to seamlessly continue the data transmission.

After receipt of an optional acknowledgement from the third RAN entity 140 (not shown in FIG. 8), the first RAN entity 110 informs the core network 150 in signaling step 940 that the user plane anchor has been changed to the third RAN entity 140. After signaling step 940, the core network 150 forwards the data packets intended for the UE 130 to the third RAN entity 140 (see step 950), which encrypts and distributes the data packets on the changed split bearer—in a similar manner as illustrated in FIG. 4 for the second RAN entity 120—to the first RAN entity 110 and the UE 130 (see step 460). The first RAN entity 110 forwards the encrypted data packets as received from the third RAN entity 120 to the UE 130

The whole user plane anchor relocation as discussed above with reference to FIG. 8 does not require any new signaling in regard of the UE 130. As such, also legacy terminal devices can benefit therefrom.

As has become apparent from the above exemplary embodiments, the present disclosure provides split bearer support from SeNB, or from RAN entities having similar roles (e.g., not acting as the control plane anchor in regard of at least some control plane functions), without necessarily requiring a change of the underlying standards. For this reason proprietary signaling between the involved RAN entities can be used to setup the split bearer and change the user plane anchor node. On the other hand, existing signaling towards the terminal devices and the core network (e.g., over the Uu and S1 interfaces) may be used in these contexts.

Depending on the actual implementation of the present disclosure, one or more of the following potential standard changes in regard of the core network and the user terminal can be avoided:

- Definition of a new split bearer type in RRC signaling via one of both of the Uu interface to the terminal device and the X2 interface to the RAN entity that is to act as the user plane anchor node.
- Definition of a new procedure for the RAN entity that is to act as the user plane anchor to derive the user plane encryption key from a base key (e.g., $K_{eNB}$) as received from the RAN entity that acts as the control plane anchor.
- Definition of a new procedure for the RAN entity that acts as the control plane anchor to require the terminal devices to generate the corresponding base key for the RAN entity that is to act as the user plane anchor, and to derive the corresponding user plane encryption key from the base key for encryption/decryption of data packets on the split bearer.

The present disclosure can be exploited in connection with the introduction of RATs beyond LTE, such as fifth or higher generation RATs (sometimes also referred to as Next Radio, NR, or simply NX). As such, it will be sufficient if only the user plane anchor node (e.g., the SeNB) supports LTE and NX/NR, while the control plane anchor node (e.g., the MeNB) supports LTE only and provides NX/NR additions via split bearers (e.g., the SeNB). Thus, the MeNB and SeNB roles as such may become obsolete from a user plane point of view in case of multiple connectivity (i.e., the individual RAN entities become equal from a user plane point of view).

Moreover, separation of user plane handling for LTE-enabled terminal devices and LTE+NX/NR-enabled terminal devices can be achieved. As an example, there can be dedicated resources for LTE+NX/NR-enabled terminal devices that do not interfere with legacy user plane handling.

Still further, the load on the transport network, and thereby transport cost, between the RAN entities can be reduced as there is no need for a high speed data interface supporting NX/NR data rates between the RAN entities (compared to conventional scenarios in which the NX/NR data traffic has to be forwarded via the X2 interface between the RAN entities). Rather, it will be sufficient if the NX/NR data rates are provided via the direct second bearer leg, while only LTE data rates are provided via the indirect first bearer leg that involves the X2 interface.

The invention claimed is:

1. A method of providing multiple connectivity to a terminal device via at least a first Radio Access Network (RAN) entity and a second RAN entity, wherein the first RAN entity serves as a control plane anchor, the method comprising:

the first RAN entity:
evaluating whether to set up a split bearer at the first RAN entity or at the second RAN entity;
deciding to set up the split bearer at the second RAN entity;
triggering the second RAN entity to set up the split bearer on a user plane;
triggering setup of the split bearer at the terminal device; and
triggering setup of a flow control receiver entity for a flow control link between a Radio Link Control (RLC) entity of the first RAN entity and a Packet Data Convergence Protocol (PDCP) entity of the second RAN entity,
wherein the split bearer comprises at least:
a first bearer leg from the second RAN entity via the first RAN entity to the terminal device; and
a second bearer leg from the second RAN entity to the terminal device without going through the first RAN entity.

2. The method of claim 1, further comprising:
obtaining, by the first RAN entity, a user plane encryption key for the split bearer; and
sending the user plane encryption key to the second RAN entity for application by the second RAN entity to data packets on at least the second bearer leg.

3. The method of claim 2, wherein the user plane encryption key is $K_{UPenc}$ according to Long Term Evolution (LTE) Release 12 or later.

4. The method of claim 1, further comprising triggering:
setup of the RLC entity and/or a Medium Access Control (MAC) entity at the first RAN entity, and an RLC entity and/or a MAC entity for the terminal device; and/or
setup of the PDCP entity, an RLC entity, and/or a MAC entity at the second RAN entity, a PDCP entity, an RLC entity, and/or a MAC entity and for the terminal device.

5. The method of claim 1, further comprising informing a core network that the split bearer is anchored at the second RAN entity by sending a network address of the second RAN entity to the core network.

6. The method of claim 1, wherein the terminal device is triggered to set up the split bearer responsive to receipt, at the first RAN entity, of a bearer setup acknowledgement from the second RAN entity.

7. The method of claim 1, wherein the first RAN entity serves as the control plane anchor for mobility management in regard of the terminal device; and/or Radio Resource Control (RRC) in regard of the terminal device.

8. A method of providing multiple connectivity to a terminal device via at least a first Radio Access Network (RAN) entity and a second RAN entity, wherein the first RAN entity serves as a control plane anchor, the method comprising:

setting up, at the second RAN entity and in response to being triggered by the first RAN entity, a split bearer on a user plane;
setting up a flow control transmitter entity for a flow control link between a Packet Data Convergence Protocol (PDCP) entity of the second RAN entity and a Radio Link Control (RLC) entity of the first RAN entity,
wherein the split bearer comprises at least:
a first bearer leg from the second RAN entity to the terminal device without going through the first RAN entity; and
a second bearer leg from the second RAN entity via the first RAN entity to the terminal device.

9. The method of claim 8, further comprising:
receiving a user plane encryption key for the split bearer from the first RAN entity; and
applying the user plane encryption key received from the first RAN entity to data packets on at least the first bearer leg.

10. The method of claim 8, further comprising setting up the PDCP entity, an RLC entity, and/or a Medium Access Control (MAC) entity at the second RAN entity, and a PDCP entity, an RLC entity, and/or a MAC entity for the terminal device.

11. The method of claim 10, further comprising sending a bearer setup acknowledgement to the first RAN entity after at least one of the following has been set up:
the PDCP entity, the RLC entity, and the MAC entity; and
the flow control transmitter entity for the flow control link between the PDCP entity of the second RAN entity and the RLC entity of the first RAN entity.

12. A Radio Access Network (RAN) entity for a system capable of providing multiple connectivity to a terminal device via at least a first RAN entity and a second RAN entity, wherein the first RAN entity serves as a control plane anchor, the RAN entity being the first RAN entity and comprising:
processing circuitry;
memory containing instructions executable by the processing circuitry whereby the RAN entity is operative to:
evaluate whether to set up a split bearer at the first RAN entity or at the second RAN entity; and
decide to set up the split bearer at the second RAN entity;
trigger the second RAN entity to set up the split bearer on a user plane;
trigger setup of the split bearer at the terminal device; and
trigger setup of a flow control receiver entity for a flow control link between a Radio Link Control (RLC) entity of the first RAN entity and a Packet Data Convergence Protocol (PDCP) entity of the second RAN entity,
wherein the split bearer comprises at least:
a first bearer leg from the second RAN entity via the first RAN entity to the terminal device; and
a second bearer leg from the second RAN entity to the terminal device without going through the first RAN entity.

13. The RAN entity of claim 12, wherein the instructions are such that the RAN entity is further operative to:
obtain a user plane encryption key for the split bearer; and
send the user plane encryption key to the second RAN entity for application by the second RAN entity to data packets on at least the second bearer leg.

14. The RAN entity of claim 13, wherein the user plane encryption key is $K_{UPenc}$ according to Long Term Evolution (LTE) Release 12 or later.

15. The RAN entity of claim 12, wherein the instructions are such that the RAN entity is further operative to trigger:
setup of the RLC entity and/or a Medium Access Control (MAC) entity at the first RAN entity, and an RLC entity and/or a MAC entity for the terminal device; and/or setup of the PDCP entity, an RLC entity, and/or a MAC entity at the second RAN entity, and a PDCP entity, an RLC entity, and/or a MAC entity for the terminal device.

16. The RAN entity of claim 12, wherein the instructions are such that the RAN entity is further operative to inform a core network that the split bearer is anchored at the second RAN entity by sending a network address of the second RAN entity to the core network.

17. The RAN entity of claim 12, wherein the instructions are such that the RAN entity is further operative to trigger the terminal device to set up the split bearer responsive to receipt of a bearer setup acknowledgement from the second RAN entity.

18. The RAN entity of claim 12, wherein the first RAN entity serves as the control plane anchor for:
   mobility management in regard of the terminal device; and/or
   Radio Resource Control (RRC) in regard of the terminal device.

19. A Radio Access Network (RAN) entity for a system capable of providing multiple connectivity to a terminal device via at least a first RAN entity and a second RAN entity, wherein the first RAN entity serves as control plane anchor, the RAN entity being the second RAN entity and comprising:
   processing circuitry;
   memory containing instructions executable by the processing circuitry whereby the RAN entity is operative to:
      set up, at the second RAN entity and in response to being triggered by the first RAN entity, a split bearer on a user plane;
      set up a flow control transmitter entity for a flow control link between a Packet Data Convergence Protocol (PDCP) entity of the second RAN entity and a Radio Link Control (RLC) entity of the first RAN entity,
   wherein the split bearer comprises at least:
      a first bearer leg from the second RAN entity to the terminal device without going through the first RAN entity; and
      a second bearer leg from the second RAN entity via the first RAN entity to the terminal device.

20. The RAN entity of claim 19, wherein the instructions are such that the RAN entity is further operative to:
   receive a user plane encryption key for the split bearer from the first RAN entity; and
   apply the user plane encryption key received from the first RAN entity to data packets on at least the first bearer leg.

21. The RAN entity of claim 19, wherein the instructions are such that the RAN entity is further operative to set up the PDCP entity, an RLC entity, and/or a Medium Access Control (MAC) entity at the second RAN entity, and a PDCP entity, an RLC entity and/or a MAC entity for the terminal device.

22. The RAN entity of claim 21, wherein the instructions are such that the RAN entity is further operative to send a bearer setup acknowledgement to the first RAN entity after at least one of the following has been set up:
   the PDCP entity, the RLC entity and the MAC entity; and
   the flow control transmitter entity for the flow control link between the PDCP entity of the second RAN entity and the RLC entity of the first RAN entity.

* * * * *